US009402072B2

(12) United States Patent
Onishi et al.

(10) Patent No.: US 9,402,072 B2
(45) Date of Patent: Jul. 26, 2016

(54) SIGNAL PROCESSING DEVICE AND VIDEO DISPLAY DEVICE INCLUDING THE SAME

(71) Applicant: Panasonic Corporation, Kadoma-shi, Osaka (JP)

(72) Inventors: Toshiki Onishi, Osaka (JP); Kazuhito Kimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 754 days.

(21) Appl. No.: 13/784,196

(22) Filed: Mar. 4, 2013

(65) Prior Publication Data

US 2013/0176393 A1 Jul. 11, 2013

Related U.S. Application Data

(63) Continuation of application No. PCT/JP2011/005531, filed on Sep. 30, 2011.

(30) Foreign Application Priority Data

Sep. 30, 2010 (JP) .................................. 2010-221280

(51) Int. Cl.
*H04N 13/04* (2006.01)
*H04N 13/00* (2006.01)
(Continued)

(52) U.S. Cl.
CPC ........... *H04N 13/0418* (2013.01); *G09G 3/003* (2013.01); *G09G 3/20* (2013.01); *G09G 3/342* (2013.01); *H04N 13/0007* (2013.01);
(Continued)

(58) Field of Classification Search
None
See application file for complete search history.

(56) References Cited

U.S. PATENT DOCUMENTS 5,471,228 A * 11/1995 Ilcisin et al. ............. G09G 3/36
345/58
6,525,699 B1 * 2/2003 Suyama ............. G02B 27/2278
345/419

(Continued)

FOREIGN PATENT DOCUMENTS

CN      101650922 A  *  2/2010    ............... G09G 3/36
JP      2001-142409       5/2001
(Continued)

OTHER PUBLICATIONS

Machine translation of CN 101650922 A.*
(Continued)

*Primary Examiner* — David N Werner
(74) *Attorney, Agent, or Firm* — Hamre, Schumann, Mueller & Larson, P.C.

(57) ABSTRACT

Local control for high-quality 3D images is achieved while reducing circuit cost and extraneous radiation. A control signal is outputted to an LED backlight 105 having a plurality of light emission areas for emitting light to a liquid crystal panel 103 from the back for the respective light emission areas corresponding to a plurality of display areas included in the liquid crystal panel 103 capable of displaying a three-dimensional image by receiving a left-eye video signal 101*b* and a right-eye video signal 101*a*, the control signal controlling the intensity of each of the light emission areas according to the intensity of an image. Light emission intensity is determined based on the left-eye video signal 101*b* and the parallax information or depth information of the image, and then information on the light emission intensity is outputted to the LED backlight 105.

14 Claims, 14 Drawing Sheets

(51) Int. Cl.
*G09G 3/34* (2006.01)
*G09G 3/20* (2006.01)
*G09G 3/00* (2006.01)
*G09G 3/36* (2006.01)

(52) U.S. Cl.
CPC ........... *H04N13/0025* (2013.01); *H04N 13/04* (2013.01); *H04N 13/0438* (2013.01); *H04N 13/0497* (2013.01); *G09G 3/3611* (2013.01); *G09G 2320/0646* (2013.01); *G09G 2360/16* (2013.01); *H04N 2013/0081* (2013.01)

(56) References Cited

U.S. PATENT DOCUMENTS

| | | | | |
|---|---|---|---|---|
| 9,300,948 | B2* | 3/2016 | Cho | H04N 13/0409 |
| 2005/0184952 | A1 | 8/2005 | Konno et al. | |
| 2010/0073768 | A1* | 3/2010 | Kim | G02B 27/2214 359/463 |
| 2010/0238274 | A1* | 9/2010 | Kim | H04N 13/0018 348/51 |
| 2010/0289836 | A1* | 11/2010 | Whitehead et al. | G09G 5/10 345/690 |
| 2011/0050861 | A1* | 3/2011 | Sakamoto | G02B 27/2242 348/51 |
| 2011/0242094 | A1* | 10/2011 | Kawahara | G09G 3/003 345/419 |
| 2011/0292184 | A1* | 12/2011 | de Greef | G09G 3/342 348/51 |
| 2012/0218255 | A1* | 8/2012 | Tsuchida | G06T 15/50 345/419 |

FOREIGN PATENT DOCUMENTS

| | | |
|---|---|---|
| JP | 2005-258403 | 9/2005 |
| JP | 2007-163562 | 6/2007 |
| JP | 2008-096696 | 4/2008 |
| JP | 2009-152897 | 7/2009 |
| JP | 2010-158013 | 7/2010 |

OTHER PUBLICATIONS

T. Sasagawa, A. Yuuki, S. Tahata, O. Murakami, & K. Oda, "Dual Directional Backlight for Stereoscopic LCD", 34 SID Symp. Dig. of Tech. Papers 399-401(May 2003).*

F. Kerofsky & S. Daly, "Brightness Preservation for LCD Backlight Dimming", 14 J. of the SID 1111-1118 (Dec. 2006).*

H. Seetzen, W. Heidrich, W. Stuerzlinger, G. Ward, L. Whitehead, M. Trentacoste, A. Ghosh, & A. Vorozcovs, "High Dynamic Range Display Systems", 23 ACM Transactions on Graphics 760-768 (Aug. 2004.*

R. Muijs, Em Langendijk & F. Vossen, "Spatio-temporally Consistent Video Processing for Local Backlight Dimming", 39 SID Symp. Dig. of Tech. Papers 979-982 (May 2008).*

H. Chen, T.H. Ha, J.h. Sung, H.R. Kim, & B.H. Han, Evaluation of LCD Backlight Local Dimming System, 40 SID Symp. Dig. of Tech. Papers 328-331 (Jun. 2009).*

C.Y. Liao, F.C. Lin, L.Y. Liao, Y.P. Huang, & H.P.D. Shieh, "Inverse of Mapping Function (IMF) Method for Image Quality Enhancement of Dual-Panel Displays", 38 SID Symp. Dig. of Tech. Papers 1343-1346 (May 2007).*

J.Y. An, S.E. Kim, W.J. Song, T.W. Lee, & C.G. Kim, "Adaptive Local Dimming Backlight for Liquid Crystal Displays", 1 Proceedings of the 15th Int'l Display Workshops 285-288 (Dec. 2008).*

F.C. Lin, Y.P. Huang, L.Y. Liao, C.Y. Liao, H.P.D. Shieh, T.M. Wang, & S.C. Yeh, "Dynamic Backlight Gamma on High Dynamic Range LCD TVs", 4 J. of Display Tech. 139-146 (Jun. 2008).*

T. Shirai, S. Shimizukawa, T. Shigar, S. Mikoshiba, & K. Käläntär, "RGB-LED Backlights for LCD-TVs with 0D, 1D, and 2D Adaptive Dimming", 37 SID Symp. Dig. of Tech. Papers 1520-1523 (Jun. 2006).*

J.J. Hong, S.E. Kim, & W.J. Song, "A Clipping Reduction Algorithm Using Backlight Luminance Compensation for Local Dimming Liquid Crystal Displays", 56 IEEE Transactions on Consumer Electronics 240-246 (Feb. 2010).*

H. Cho & O.K. Kwon, "A Backlight Dimming Algorithm for Low Power and High Image Quality LCD Applications", 55 IEEE Transactions on Consumer Electronics 839-844 (May 2009).*

H. Chen, J. Sung, T. Ha, Y. Park & C. Hong, "Backlight Local Dimming Algorithm for High Contrast LCD-TV", 6 Proc. of ASID 168-171 (Oct. 2006).*

G.Z. Wang, F.C. Lin, & Y.P. Huang, "Delta-color Adjustment (DCA) for Spatial Modulated Color Backlight Algorithm on High Dynamic Range LCD TVs", 6 J. of Display Tech. 215-220 (Jun. 2010).*

G.Z. Wang, Y.P. Huang, H.P.D. Shieh, & S.C. Yeh, "Segment Color Control (SCC) Method for Color Controlled Backlight of High Dynamic Range LCD-TVs", 40 SID Symp. Dig. of Tech. Papers 757-759 (Jun. 2009).*

\* cited by examiner

F I G. 3
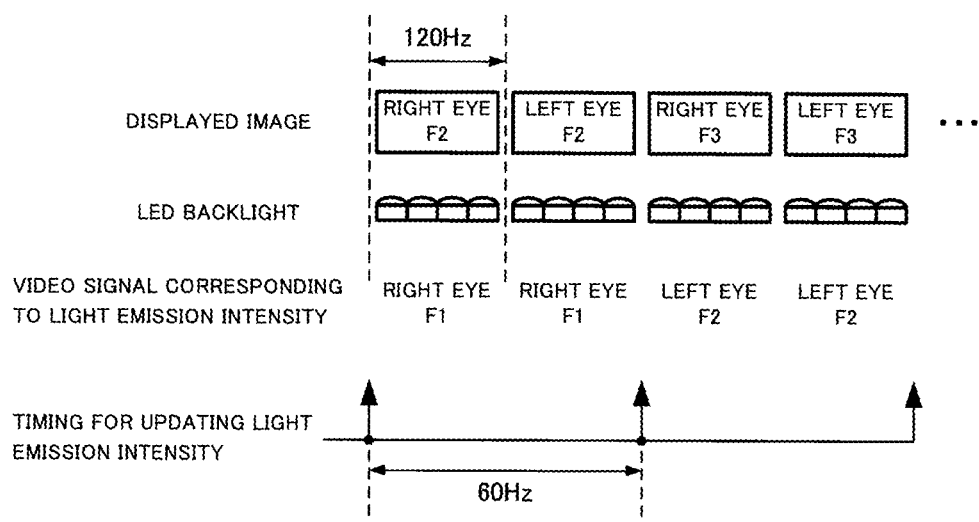

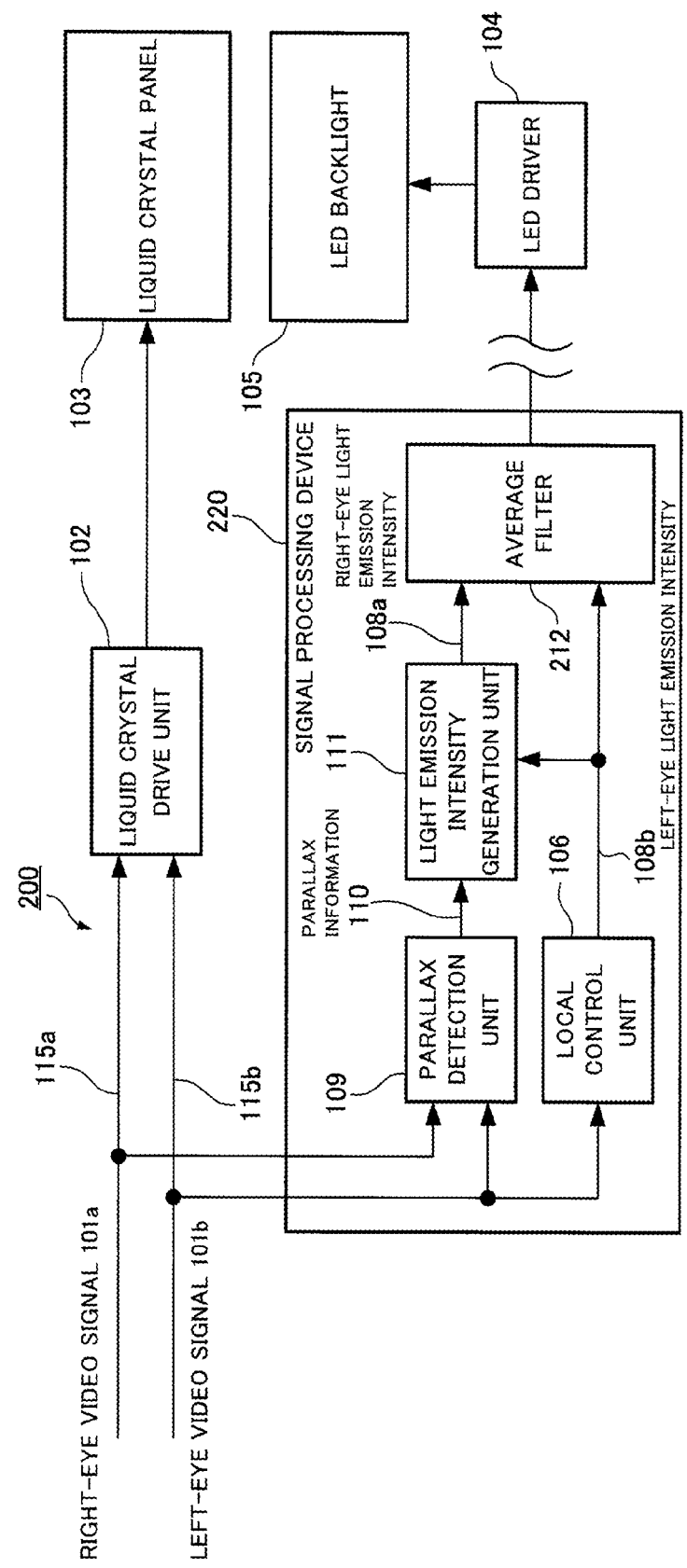
F I G. 5

F I G. 12
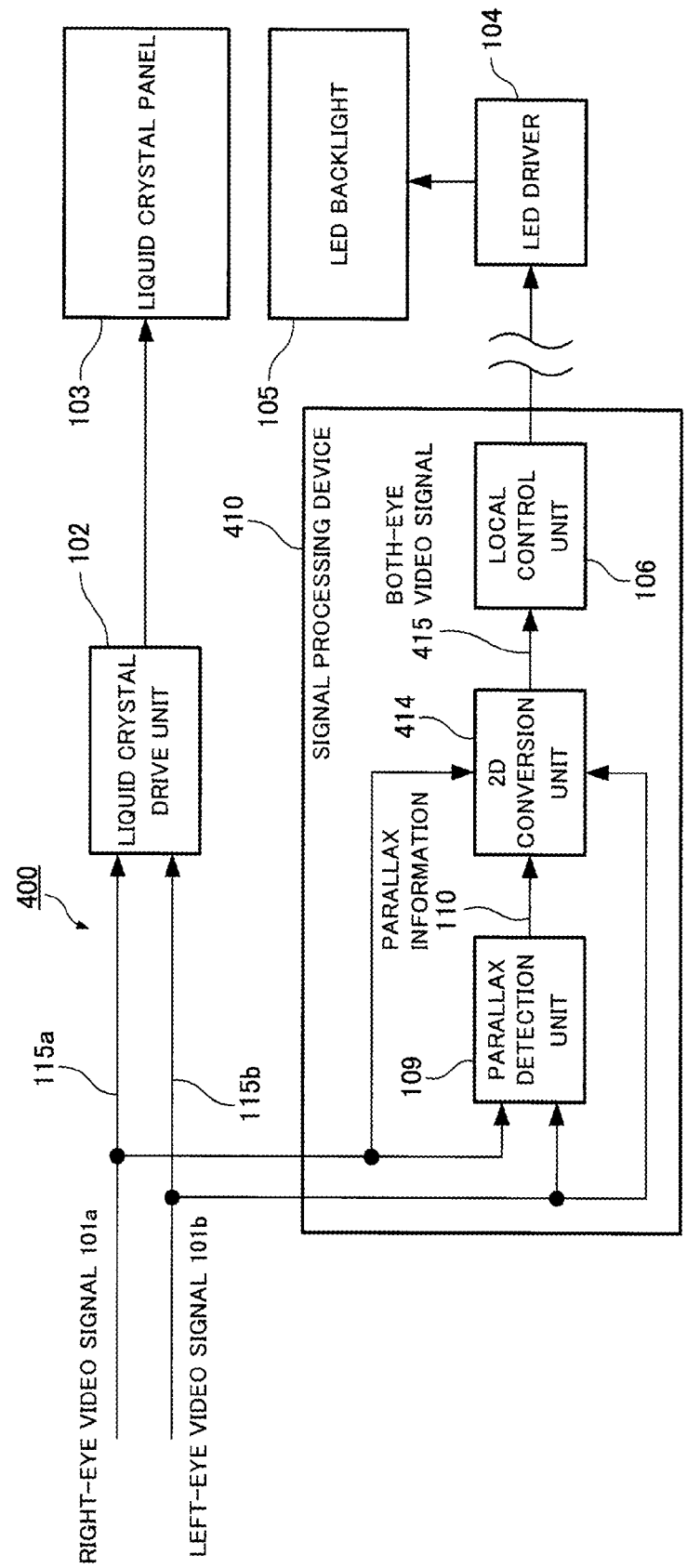

F I G. 1 3 A
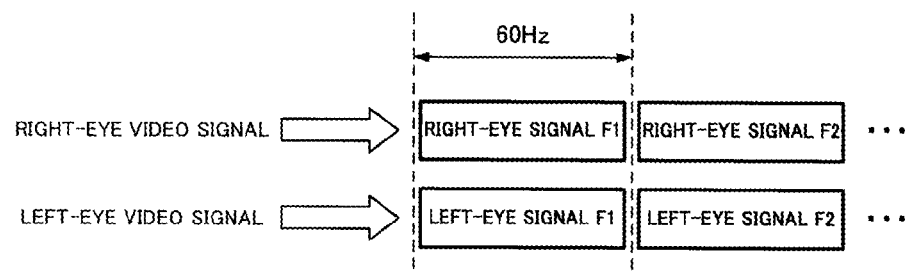
F I G. 1 3 B
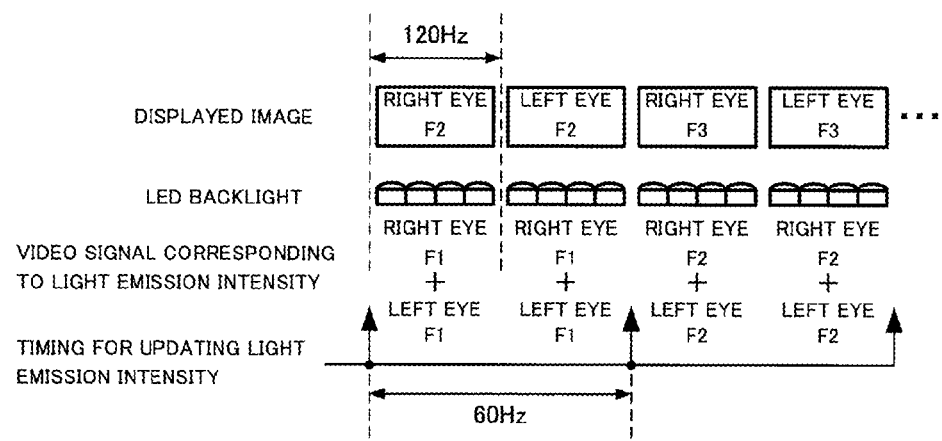

SIGNAL PROCESSING DEVICE AND VIDEO DISPLAY DEVICE INCLUDING THE SAME

FIELD OF THE INVENTION

The present invention relates to a signal processing device and a video display device including the same.

BACKGROUND OF THE INVENTION

A liquid crystal display device acting as a video display device illuminates a liquid crystal panel with an LED backlight including light emitting diodes (LEDs).

Particularly, for such a video display device, a technique called "local contrast control" is known (e.g., Japanese Patent Laid-Open No. 2001-142409). In this technique, LEDs are two-dimensionally arranged directly under a liquid crystal panel and the brightness of the LED is controlled according to the feature quantity of a video signal, mainly an intensity value. The local contrast control can improve the contrast of a displayed image.

In recent years, video display devices (hereinafter, will be called 3D-TVs) with a 3D (Three Dimension) display function have been announced one after another. A 3D-TV displays a left-eye image and a right-eye image at the same time or in a time sharing manner, allowing a viewer to recognize a three-dimensional image. The former is called an image segmentation system while the latter is called a time-sharing system.

Local contrast control is expected to be introduced to 3D-TVs in the future. In this case, a feature quantity needs to be detected for a left-eye image and a right-eye image. Particularly, in the time-sharing system, the intensity of a backlight needs to be alternately switched between the left-eye image and the right-eye image based on the set intensity value of an LED backlight, the set value being determined by the feature quantity.

FIG. 14 illustrates a typical configuration of a 3D-TV of the time-sharing system with a local contract control function. FIG. 14 illustrates a liquid crystal display device that displays full high definition (FHD) images for left and right eyes in a time sharing manner with a frequency of 120 Hz. Shutter glasses synchronized with the switching of left and right displayed images are worn to enable stereoscopic vision.

As shown in FIG. 14, a video display device 1000 receives FHD video signals of two systems: a right-eye video signal 1001a and a left-eye video signal 1001b. A video signal transmitted in a 3D transmission format of High-Definition Multimedia Interface (HDMI) is outputted after undergoing expansion, I/P (Interlace/Progressive) conversion, and so on in a circuit (not shown) preceding the configuration of FIG. 14. FIG. 15A shows the state of the output. As shown in FIG. 15A, the right-eye video signal 1001a and the left-eye video signal 1001b are in-phase signals (simultaneously inputted) with a frame period of 60 Hz. A liquid crystal drive unit 1002 displays an image on a liquid crystal panel 1003 based on the video signals 1001 (1001a, 1001b). The liquid crystal panel 1003 is illuminated from the back by an LED backlight 1005 driven by an LED driver 1004. In this configuration, the video display device 1000 includes a signal processing device 1010 that outputs a brightness control signal to the LED backlight 1005 that illuminates the liquid crystal panel 1003 with light from the back. The signal processing device 1010 includes two local control units 1006 (right-eye local control unit 1006a and left-eye local control unit 1006b) that determine the light quantity of an LED for illuminating an image according to a feature quantity for each of right and left eyes, and a selector (selecting unit) 1007 that transmits results determined by the local control units 1006, to the LED driver 1004 while switching the results every 120 Hz. As shown in FIG. 15B, a displayed image and an inputted image are provided at different times, and thus the signal processing device 1010 of the video display device 1000 further includes a delay adjusting memory 1008 that absorbs the difference. Hence, when the liquid crystal panel 1003 displays a right-eye image, the LED backlight 1005 is illuminated according to the feature quantity of the right-eye video signal 1001a in the previous frame. When a left-eye image is displayed, the LED backlight 1005 is illuminated according to the feature quantity of the left-eye video signal 1001b in the previous frame.

DISCLOSURE OF THE INVENTION

In the signal processing device 1010 of the conventional video display device 1000, however, the local control units 1006 (1006a, 1006b) are necessary for right and left eyes, respectively. The signal processing device 1010 of the video display device 1000 further requires the delay adjusting memory 1008, leading to a large circuit size and high manufacturing cost. Moreover, in the video display device 1000, communications relating to the light emission intensity of an LED are carried out with the LED driver 1004 every 120 Hz. Thus, unfortunately, large extraneous radiation may occur at this point and other electronic components may be adversely affected by noise. Furthermore, the signal processing device 1010 of the video display device 1000 leads to a large circuit size, disadvantageously requiring a large amount of power for keeping an output.

The present invention has been devised in consideration of these points. An object of the present invention is to provide a signal processing device and a video display device including the same which can achieve local control for high-quality 3D images while reducing circuit cost and extraneous radiation.

A signal processing device of the present invention is a signal processing device that outputs a control signal to light emitting elements having a plurality of light emission areas for emitting light to an image display part from the back for the respective light emission areas corresponding to a plurality of display areas included in the image display part capable of displaying a three-dimensional image by receiving a left-eye video signal and a right-eye video signal, the control signal controlling the intensity of each of the light emission areas according to the intensity of an image, the signal processing device including a light emission intensity determination unit that determines light emission intensity based on at least one of the left-eye video signal and the right-eye video signal and one of parallax information and depth information of the image and outputs information on the light emission intensity to the light emitting elements.

With this configuration, light emission intensity is determined based on at least one of the left-eye video signal and the right-eye video signal and one of the parallax information and the depth information of the image. Thus, the number of local control units can be reduced to one, leading to lower circuit cost. Moreover, light emission intensity is determined based on the left-eye video signal and the right-eye video signal, achieving local control for a high-quality 3D image. Specifically, local control based on an image only for one viewpoint of the right-eye video signal and the left-eye video signal may cause unbalanced intensity when an image for the other viewpoint is displayed. The present invention can suppress the occurrence of such a problem.

Furthermore, the light emission intensity determination unit includes: a local control unit that determines first light emission intensity corresponding to a first video signal serving as a video signal for one viewpoint of the left-eye video signal and the right-eye video signal; a parallax detection unit that obtains parallax information from the left-eye video signal and the right-eye video signal; and a light emission intensity generation unit that generates second light emission intensity corresponding to the video signal for the other viewpoint based on the first light emission intensity and the parallax information.

With this configuration, the second light emission intensity corresponding to the video signal for the other viewpoint is generated based on the first light emission intensity and the parallax information. Thus, the circuit size of the signal processing device can be smaller than in the case where a local control unit that generates the second light emission intensity corresponding to the video signal for the other viewpoint is provided in addition to the local control unit that determines the first light emission intensity.

Moreover, the light emission intensity determination unit includes: a local control unit that determines first light emission intensity corresponding to a first video signal serving as a video signal for one viewpoint of the left-eye video signal and the right-eye video signal; and a light emission intensity generation unit that generates second light emission intensity corresponding to the video signal for the other viewpoint based on the first light emission intensity and the depth information of the image.

With this configuration, the second light emission intensity corresponding to the video signal for the other viewpoint is generated based on the first light emission intensity and the depth information of the image. Thus, the circuit size of the signal processing device can be smaller than in the case where a local control unit that generates the second light emission intensity corresponding to the video signal for the other viewpoint is provided in addition to the local control unit that determines the first light emission intensity.

The signal processing device of the present invention further includes a selection unit that switches the signal corresponding to the first light emission intensity and the signal corresponding to the second light emission intensity, and outputs the signal to a drive unit that drives the light emitting elements.

Moreover, the light emission intensity determination unit of the signal processing device according to the present invention includes a filter processing unit that outputs a signal with average light emission intensity obtained by averaging the first light emission intensity and the second light emission intensity, to a drive unit that drives the light emitting elements.

The light emission intensity determination unit of the signal processing device according to the present invention includes a filter processing unit that outputs a signal smoothed based on past average light-emission intensity signals, to a drive unit that drives the light emitting elements, the smoothed signal having average light emission intensity of the first light emission intensity and the second light emission intensity.

The light emission intensity determination unit of the signal processing device according to the present invention includes a filter processing unit that combines the first light emission intensity and the second light emission intensity while correcting the first light emission intensity and the second light emission intensity closer to higher one of the first light emission intensity and the second light emission intensity, and then outputs the light emission intensity to a drive unit that drives the light emitting elements.

With this configuration, in the case of a large parallax between the left and right, darkening more than necessary and a reduction in contrast can be advantageously minimized in the light emission area corresponding to the display area.

The light emission intensity determination unit of the signal processing device according to the present invention includes a filter processing unit that combines the first light emission intensity and the second light emission intensity while correcting the first light emission intensity and the second light emission intensity closer to higher one of the first light emission intensity and the second light emission intensity as a difference of intensity increases between the first light emission intensity and the second light emission intensity, and then outputs the light emission intensity to a drive unit that drives the light emitting elements.

The light emission intensity determination unit of the signal processing device according to the present invention includes: a local control unit that determines first light emission intensity corresponding to a first video signal serving as a video signal for one viewpoint of the left-eye video signal and the right-eye video signal; and a light emission intensity correction/generation unit that corrects the first light emission intensity based on one of parallax information and depth information of the video signal to generate information about common light emission intensity.

With this configuration, the first light emission intensity is corrected based on one of the parallax information and the depth information of the video signal to generate information about common light emission intensity. Thus, the circuit size of the signal processing device can be smaller than in the case where a local control unit that generates the second light emission intensity corresponding to the video signal for the other viewpoint is provided in addition to the local control unit that determines the first light emission intensity.

The light emission intensity determination unit of the signal processing device according to the present invention includes: a both-eye image conversion unit that obtains a both-eye video signal based on a first video signal serving as a video signal for one viewpoint of the left-eye video signal and the right-eye video signal and one of parallax information and depth information of the video signal; and a local control unit that determines light emission intensity based on the both-eye video signal of the both-eye image conversion unit.

With this configuration, the both-eye video signal is obtained based on the first video signal serving as a video signal for one viewpoint and one of the parallax information and the depth information of the video signal, and light emission intensity is determined based on the both-eye video signal. Thus, the circuit size of the signal processing device can be smaller than in the case where a local control unit that generates the second light emission intensity corresponding to the video signal for the other viewpoint is provided in addition to the local control unit that determines the first light emission intensity.

Moreover, the light emission intensity determination unit has an updating period that is 1/N of a frame period displayed on the image display part, where N is an even number.

This configuration makes it possible to reduce a transfer period for the light emitting elements by one-half without degrading image quality, thereby reducing extraneous radiation.

Furthermore, the light emission intensity determination unit has an updating period that is a frame period not longer than a frame period displayed on the image display part.

The signal processing device of the present invention further includes an interpolation circuit that interpolates the video signal to output a video output signal to the image display part at a higher frequency than the frequency of the input signal of the video signal, wherein light emission intensity information is outputted to the light emitting elements concurrently with an image outputted to the image display part, the light emission intensity information corresponding to the image of the same frame number as the outputted image.

With this configuration, the timing for displaying an image on the image display part perfectly matches with the timing for adjusting intensity on the light emitting elements, advantageously achieving local contrast control in quite a satisfactory manner.

A video display device according to the present invention includes: an image display part that has a plurality of display areas and is capable of displaying a three-dimensional image by receiving a left-eye video signal and a right-eye video signal; a display drive unit that drives the image display part; light emitting elements that have a plurality of light emission areas corresponding to the respective display areas and emit light from the back for the respective light emission areas; a light-emitting element drive unit that drives the light emitting elements; and one of the signal processing devices.

The present invention can provide a signal processing device and a video display device including the same which can achieve local control for high-quality 3D images while reducing circuit cost and extraneous radiation.

BRIEF DESCRIPTION OF THE DRAWINGS

FIG. 3 shows the relationship between a displayed image, a frame rate, and the timing for updating light emission intensity of the video display device including a selector according to a modification of the signal processing device of the first embodiment;

FIG. 5 is a block diagram illustrating the configuration of a video display device including a signal processing device according to a second embodiment;

FIG. 12 is a block diagram illustrating the configuration of a video display device including a signal processing device according to a fourth embodiment;

FIG. 13A shows video signals inputted to the video display device;

FIG. 13B shows the relationship between the frame rate of a displayed image of the video display device and the timing for updating light emission intensity;

DESCRIPTION OF THE EMBODIMENTS

Figure 1:
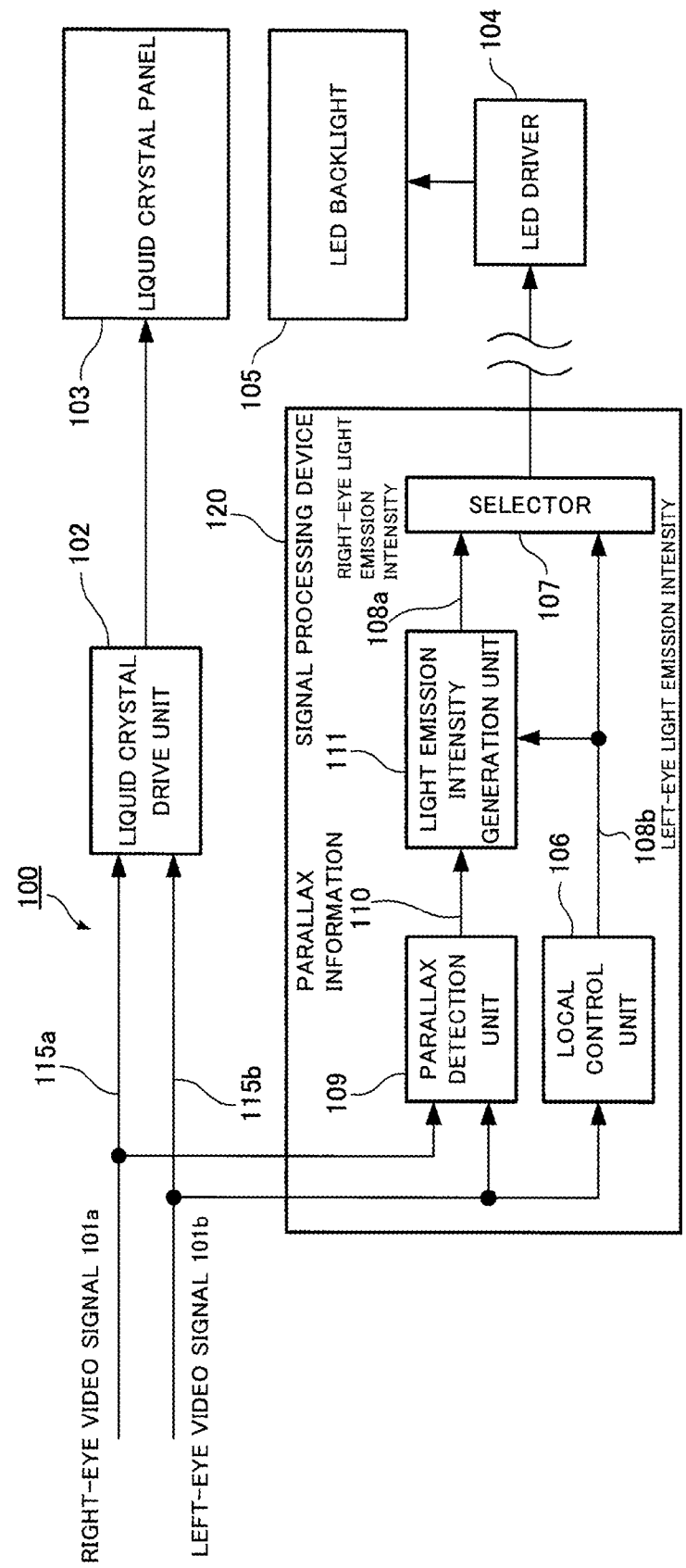
FIG. 1 is a block diagram illustrating the configuration of a video display device including a signal processing device according to a first embodiment.

Embodiments will be specifically described below with reference to the accompanying drawings. The same parts in the drawings are indicated by the same reference numerals and are not repeatedly explained.

(First Embodiment)

FIG. 1 is a block diagram illustrating the configuration of a video display device including a signal processing device according to a first embodiment. As illustrated in FIG. 1, a video display device 100 includes a liquid crystal drive unit 102, a liquid crystal panel 103, an LED driver 104, an LED backlight 105, and a signal processing device 120.

The liquid crystal drive unit 102 generates a driving signal for driving the liquid crystal panel 103 based on a right-eye video signal 101*a* and a left-eye video signal 101*b* that are input signals. The liquid crystal drive unit 102 outputs the generated driving signal to the liquid crystal panel 103.

The liquid crystal panel 103 increases or reduces the transmittance of light based on the driving signal generated by the liquid crystal drive unit 102, thereby adjusting a quantity of light emitted from the LED backlight 105.

The LED driver 104 generates a driving signal for driving the LED backlight 105, based on a signal generated by the signal processing device 120.

The LED backlight 105 is located on the back of the liquid crystal panel 103 to cause LEDs to emit light based on the signal generated by the LED driver 104. Specifically, the LED backlight 105 illuminates the liquid crystal panel 103 from the back. The LED backlight 105 is composed of LED (light-emitting diode) elements that are light emitting elements. The LED driver 104 can control the light emission intensity of each group containing at least one LED element. In other words, light emission areas corresponding to the respective display areas of the liquid crystal panel 103 can be controlled with different intensity values. The optical configuration of the LED backlight 105 includes multiple LED elements arranged on the back of the liquid crystal panel 103. Alternatively, the optical configuration includes a backlight plate placed on the back of the liquid crystal panel 103 and multiple LED elements arranged on lines intersecting at right angles on a surface of the backlight plate parallel to the liquid crystal panel 103.

The signal processing device 120 outputs a signal to the LED backlight 105 to determine a light emission intensity and control brightness.

A specific configuration of the signal processing device 120 will be described below.

The signal processing device 120 includes a local control unit 106, a selector 107, a parallax detection unit 109, and a light emission intensity generation unit 111.

The local control unit 106 determines a left-eye light emission intensity (first light emission intensity) 108b based on the left-eye video signal 101b when a left-eye image is displayed on the liquid crystal panel 103. The left-eye light emission intensity 108b is the light emission intensity of the LED backlight 105 that illuminates the liquid crystal panel 103 from the back. The local control unit 106 outputs the determined left-eye light emission intensity 108b to the selector 107 and the light emission intensity generation unit 111.

Specifically, the local control unit 106 extracts a video feature quantity in the left-eye video signal 101b. In this case, the video feature quantity is information including an average intensity value, maximum intensity, and minimum intensity. The local control unit 106 extracts the video feature quantity for each display area obtained by dividing the whole screen area of the liquid crystal panel 103. Typically, the display area is aligned with a light emission area that is a unit of control of the backlight emission intensity of the liquid crystal panel 103 from the LED backlight 105. Backlight emission intensity in a light emission area corresponding to a feature quantity extraction area is determined according to the extracted feature quantity. The local control unit 106 collectively outputs backlight emission intensity calculated for the display areas, as the left-eye light emission intensity 108b to the selector 107.

The selector 107 switches right-eye light emission intensity 108a and the left-eye light emission intensity 108b in synchronization with left and right images displayed on the liquid crystal panel 103 and then outputs the emission intensity to the LED driver 104. Specifically, in the case where an image displayed on the liquid crystal panel 103 is a right-eye image, the selector 107 outputs the right-eye light emission intensity 108a. In the case where an image displayed on the liquid crystal panel 103 is a left-eye image, the selector 107 outputs the left-eye light emission intensity 108b.

The parallax detection unit 109 detects a parallax between the right-eye video signal 101a and the left-eye video signal 101b and outputs the detected result as parallax information 110 to the light emission intensity generation unit 111.

The light emission intensity generation unit 111 generates the right-eye light emission intensity (second light emission intensity) 108a based on the parallax information 110 and the left-eye light emission intensity 108b. The right-eye light emission intensity 108a is the light emission intensity of the LED backlight 105 for illuminating the liquid crystal panel 103 from the back when a right-eye image is displayed on the liquid crystal panel 103. For example, the right-eye light emission intensity 108a is determined by shifting (moving) the left-eye light emission intensity 108b according to the parallax of the parallax information 110 obtained in the parallax detection unit 109.

Reference numeral 115a in FIG. 1 indicates a first video signal line to which the right-eye video signal 101a is inputted. Reference numeral 115b in FIG. 1 indicates a second video signal line to which the left-eye video signal 101b is inputted. In this configuration, the video display device 100 according to the present embodiment receives the video signals from the two video signal lines (the first video signal line 115a and the second video signal line 115b).

The video display device 100 is provided with a 2D-3D converter circuit and a 3D image converter circuit (not shown) that are located prior to the video display device 100, and the right-eye video signal 101a and the left-eye video signal 101b are outputted to the liquid crystal drive unit 102 and the signal processing device 120. In this case, the 2D-3D converter circuit generates a 3D video signal from a typical 2D video signal by signal processing. The 3D image converter circuit converts a 3D image that is inputted through a 3D broadcast tuner or an apparatus complying with HDMI of version 1.4 or higher for 3D images, into a progressive (noninterlaced) full-screen image. Specifically, the 3D image converter circuit converts a 60-Hz 3D video signal inputted through a signal line system with SIDE-BY-SIDE-HALF resolution of 1920×1080i, into left and right two-system output images with resolution of 1920×1080p by expansion and I/P conversion.

Figure 2A:
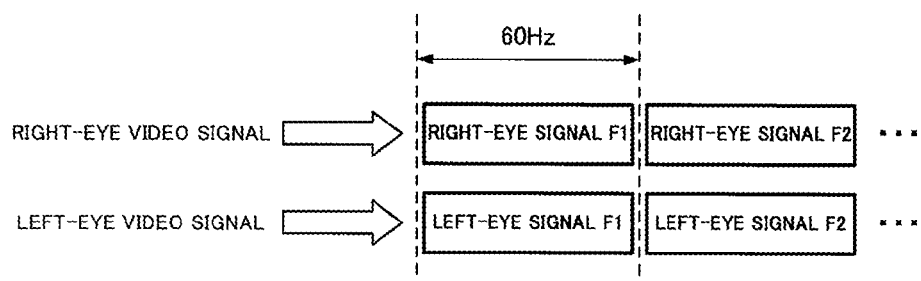
FIG. 2A shows video signals inputted to the video display device.

FIG. 2A shows the video signals that are outputted from the 2D-3D converter circuit or the 3D image converter circuit of the preceding stage and are inputted to the video display device 100. Generally, in a digital 2D video display device, I/P converted video signals for both eyes with resolution of 1920×1080p are handled. In the case of a 3D video display device that provides progressive display of images of the right-eye video signal 101a and the left-eye video signal 101b with resolution of 1920×1080 in a time sharing manner, a band twice as large as that in 2D video display is necessary. The processing speed of the video signal in 2D video display may be doubled in 3D video display in the video display device 100. In reality, a signal is generally split to two systems to obtain a band while keeping a processing speed. As shown in FIG. 2A, the right-eye video signal 101a and the left-eye video signal 101b are in-phase signals (simultaneously inputted), each having resolution of 1920×1080 and a frame period of 60 Hz. Reference character F in FIGS. 2A, 2B, and so on represents the prefix of a frame number.

These video signals (right-eye video signal 101a and left-eye video signal 101b) are inputted to the liquid crystal drive unit 102. The liquid crystal drive unit 102 drives the liquid crystal panel 103 so as to display images based on the right-eye video signal 101a and the left-eye video signal 101b every 120 Hz. Generally, image quality adjusting circuits (not shown) are generally inserted in the preceding stage of the liquid crystal drive unit 102. In the case where a video signal input part is split to two systems as in the present embodiment, image quality adjusting circuits are provided for the respective video signal lines 115a and 115b.

As has been discussed, images based on the right-eye video signal 101a and images based on the left-eye video signal 101b are alternately displayed on the liquid crystal panel 103. Thus, the LED backlight 105 is desirably illuminated with optimum light emission intensity for the displayed video signals in synchronization with the switching of the signals.

A light emission intensity signal will be specifically described below.

The light emission intensity signal is transmitted to the LED driver 104 by serial communications according to methods such as a serial peripheral interface (SPI) and an inter-integrated circuit (I2C). Images displayed on the liquid crystal panel 103 are laterally switched at 120 Hz, and thus the light emission intensity is also transmitted to the LED driver 104 every 120 Hz. This state is shown in FIG. 2B.

Figure 2B:
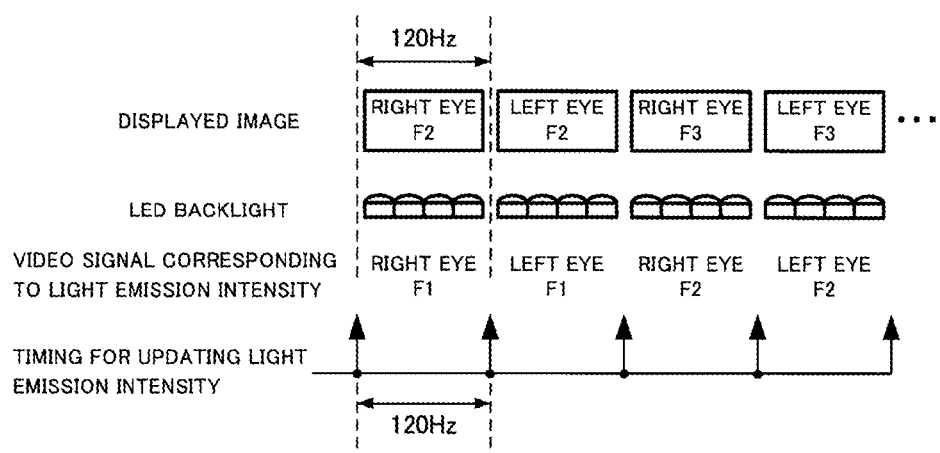
FIG. 2B shows the relationship between a display image of the video display device, a frame rate, and the timing for updating light emission intensity.

As shown in FIG. 2B, updates of light emission intensity are reflected on the LED backlight 105 with the same rate as the frame rate of the displayed images. Right-eye images and left-eye images are alternately displayed on the liquid crystal panel 103 every 120 Hz. Regarding "the state of light emission", however, LED elements are generally driven under pulse width modulation (PWM) control in which backlight blinking and backlight scanning are used in combination. The driving period is a frequency equivalent to an integral multiple of the period of the displayed image. Theoretically, calculated light emission intensity is delayed from the video signal by one frame. Thus, as shown in FIG. 2B, the frame rate number of the video signal corresponding to light emission intensity is shifted by one from the frame number of the displayed image.

In this case, the video signal inputted to the preceding circuit of the video display device 100 has SIDE-BY-SIDE-HALF resolution of 1920×1080i and a frequency of 60 Hz. The video format, the resolution, and the frequency are not particularly limited, also in the description of the subsequent embodiments.

In the present embodiment, the right-eye and left-eye video signals are inputted from the preceding circuit of the video display device 100 through the two video signal lines 115a and 115b. A video information amount may be reduced by one-half for each of the video signal lines 115a and 115b while the left and right video signals are alternately switched at 120 Hz. According to the transmission system, a video information amount transmitted through the two video signal lines 115a and 115b every 60 Hz is equal to the information amount of the video signal inputted to the video display device 100 every 60 Hz. The right and left video information is split to the two different video signal lines 115a and 115b. The video information can be divided into "video information located at the top and bottom (upper half and lower half) of a screen", "video information located on the right and left sides (left half and right half) of the screen", "even-numbered pixels and odd-numbered pixels", and so on. The processing of the liquid crystal drive unit 102 may be simplified because right and left images are switched and inputted every 120 Hz, whereas the processing of the parallax detection unit 109 and the local control unit 106 may become complicated because the inputs are laterally switched in a time sharing manner.

In the present embodiment, the video signals are inputted through the two video signal lines 115a and 115b. This configuration is described for comparison with an input through the single video signal line of the conventional 2D video display device. Video signals may be inputted from, for example, four video signal lines (a right-eye video clock and a left-eye video clock are reduced by one-half and a signal line is added for each of the right-eye and left-eye video clocks to obtain a band). In this case, the video signals are inputted to the liquid crystal drive unit 102, the parallax detection unit 109, and the local control unit 106 through the four signal lines. As a result, the processing in FIG. 2B is unchanged except for the video clocks reduced by one-half, also in the subsequent embodiments.

Furthermore, light emission intensity determined by the local control unit 106 may be inputted to the image quality adjusting circuit located prior to the liquid crystal drive unit 102, and then the video signal may be corrected according to the light emission intensity. The image correction can improve the quality of an image finally displayed by a combination of an image on the liquid crystal panel 103 and the intensity of the partially controlled LED backlight 105, also in the subsequent embodiments.

The video display device 100 can receive and display a 2D image as well as a 3D image. In this case, a 2D image, that is, the laterally identical video signal is passed through, for example, the second video signal line 115b that is the path of the left-eye video signal 101b illustrated in FIG. 1. The path of the second video signal line 115a for the right-eye video signal 101a is left unused. The inputted video signal is, for example, a signal with resolution of 1920×1080p and a frequency of 60 Hz. The liquid crystal drive unit 102 drives the liquid crystal panel 103 with the same frame rate as the frame rate of the video signal inputted to the liquid crystal drive unit 102. The local control unit 106 determines the light emission intensity of the LED backlight 105 based on the 2D video signal that is an input video signal. The selector 107 is always operated so as to obtain an output from the local control unit 106, is synchronized with the frame rate of an image displayed on the liquid crystal panel 103, and transfers a light emission intensity command value to the LED driver 104 to update light emission intensity at each update of the frame.

According to the video display device 100 and the signal processing device 120 of the present embodiment, the conventional video display device 1000 and the local control unit 1006a for calculating light emission intensity for a right eye and the left-eye delay memory 1008 in the signal processing device 1010 are replaced with the parallax detection unit 109 and the light emission intensity generation unit 111. With this configuration, the local control unit 1006a with a large circuit size is replaced with the small-sized parallax detection unit 109 and the small-sized light emission intensity generation unit 111, achieving a smaller circuit size than in the conventional configuration.

In the first embodiment, the selector (selecting unit) 107 of the signal processing device 120 is switched in synchronization with an image displayed on the liquid crystal panel 103. The configuration is not particularly limited. For example, the selector 107 of the signal processing device 120 according to the first embodiment in FIG. 1 may switch the right-eye light emission intensity signal 108a and the left-eye light emission intensity signal 108b as shown in FIG. 3 with a frequency lower than the switching frequency of the liquid crystal panel 103, e.g., a half frequency (e.g., 60 Hz).

With this configuration, as shown in FIG. 3, the signal processing device 120 carries out communications relating to the light emission intensity of the LED with the LED driver 104 every 60 Hz. Thus, extraneous radiation at this point can be considerably reduced as compared with the video display device 1000 and the signal processing device 1010 of the conventional configuration, thereby preventing noise from adversely affecting other electronic components.

Also in this configuration, the light emission intensity value of a light emission area is determined based on the right-eye light emission intensity signal 108a and the left-eye light emission intensity signal 108b, achieving local control for a high-quality 3D image. Specifically, local control only based on an intensity signal for one viewpoint of the right-eye video signal 101a and the left-eye video signal 101b may cause unbalanced intensity when an image for the other viewpoint is displayed. The present embodiment can suppress the occurrence of such a problem.

Figure 4:
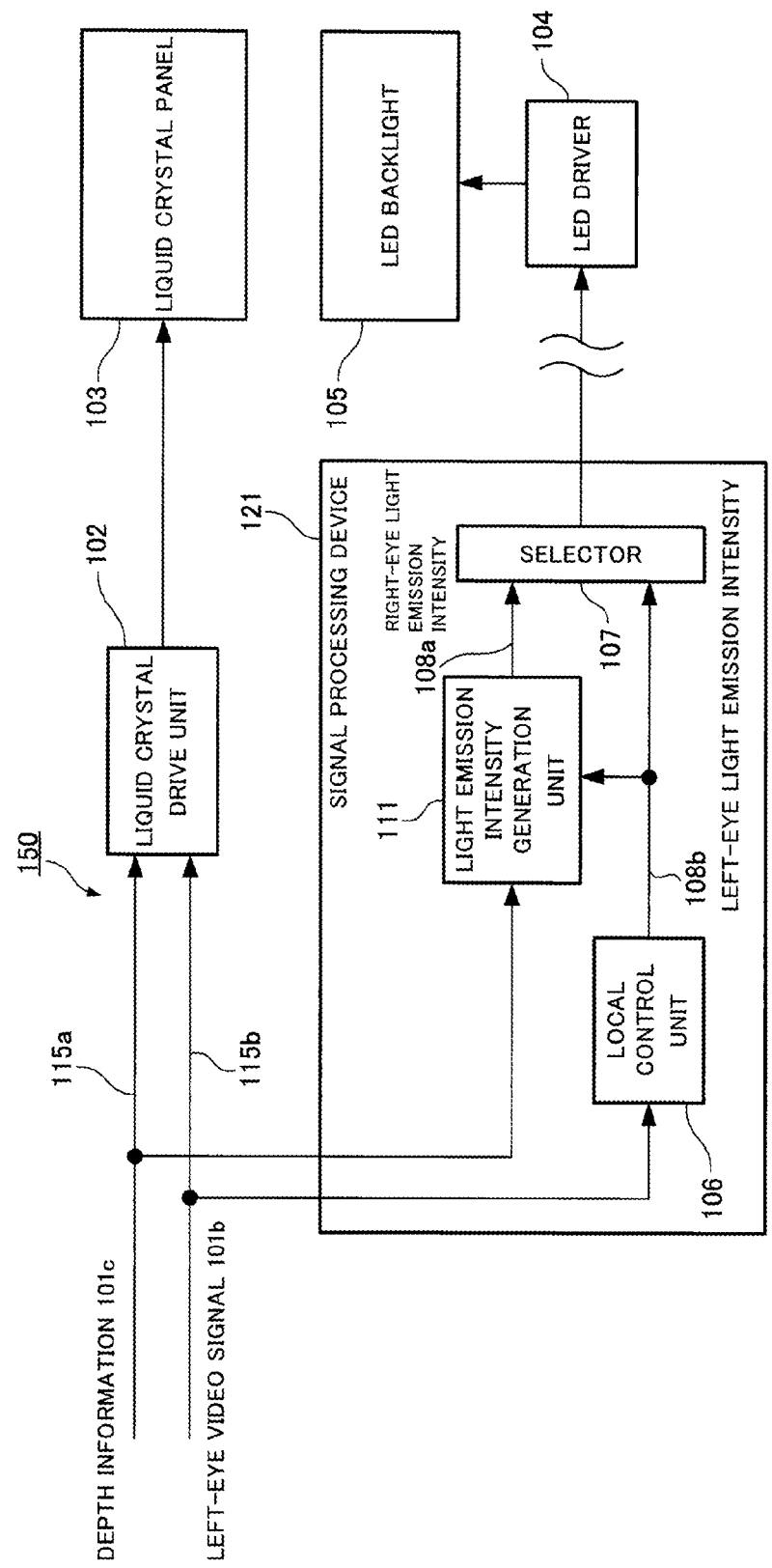
FIG. 4 is a block diagram illustrating the configuration of the video display device including another modification of the signal processing device according to the first embodiment.

A video format for HDMI of version 1.4 or higher is "left-eye video signal+depth information (equivalent to parallax information)". In the case where such a signal is inputted instead of the right-eye video signal and the left-eye video signal, the parallax detection unit 109 is not necessary. Thus, it is only necessary to input depth information, which is a direct input signal, as parallax information to the light emission intensity generation unit 111 as in the video display device 150 and the signal processing device 121 illustrated in FIG. 4. Thus, in this case, the circuit size is further reduced.

(Second Embodiment)

Figure 7:
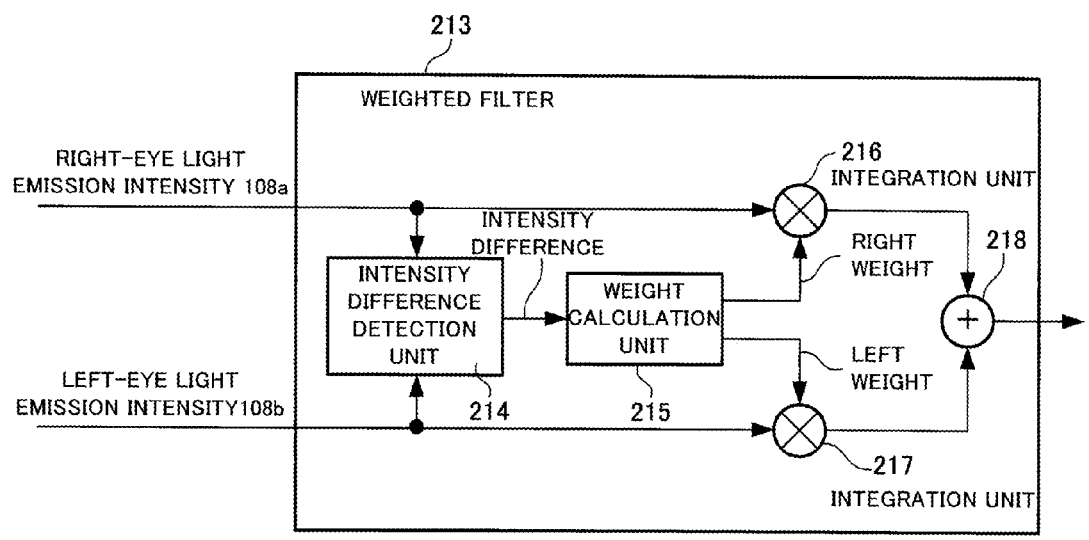
FIG. 7 is a block diagram illustrating a weighted filter provided in the signal processing device of the video display device according to the second embodiment.

FIG. 5 is a block diagram illustrating the configuration of a video display device 200 according to a second embodiment. FIG. 5 corresponds to FIG. 1 of the first embodiment. As illustrated in FIG. 5, the second embodiment is different from the first embodiment in that a signal processing device 220 in the video display device 200 includes an average filter 212 as a filter processing unit or a weighted filter 213 in FIG. 7 instead of the selector 107 of the video display device 100.

Figure 8:
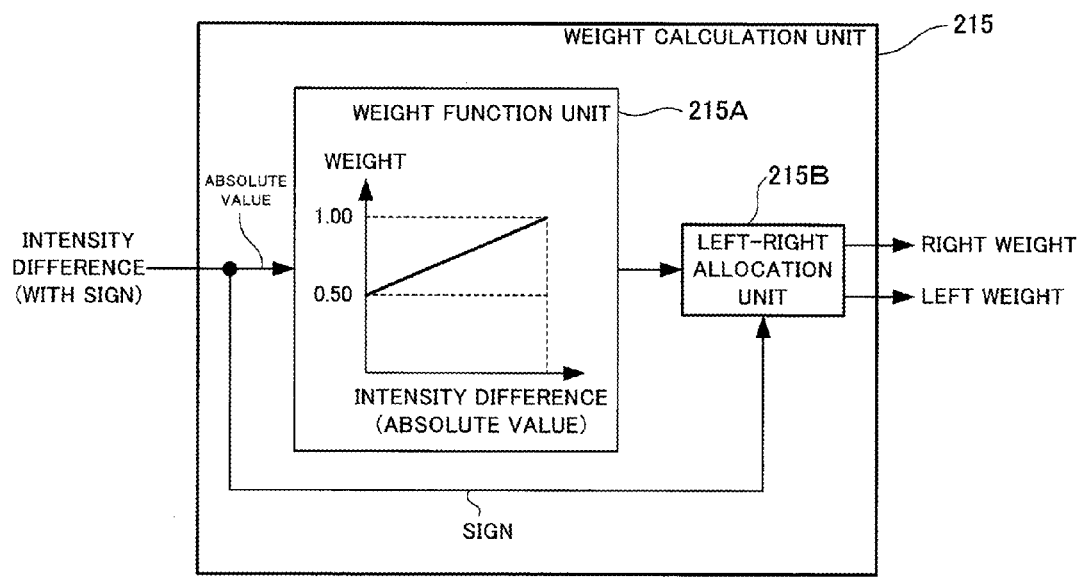
FIG. 8 shows the characteristics of the weighted filter provided in the signal processing device.

The weighted filter 213 includes an intensity difference detection unit 214 that detects a difference of intensity between a right-eye video signal 101a and a left-eye video signal 101b, a weight calculation unit 215 that calculates a right weight and a left weight based on the difference of intensity, an integration unit 216 that processes the right-eye video signal 101a with the right weight, an integration unit 217 that processes the left-eye video signal 101b with the left weight, and an addition unit 218 that sums the output of the integration unit 216 and the output of the integration unit 217. FIG. 8 shows a specific example of the weight calculation unit 215.

Figure 6A:
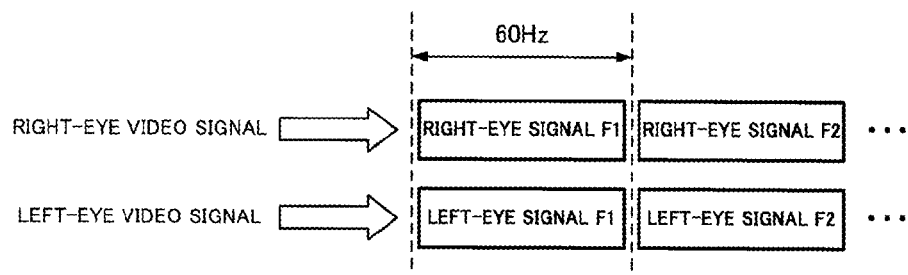
FIG. 6A shows video signals inputted to the video display device.

Also in the present embodiment, a 3D video signal with SIDE-BY-SIDE-HALF resolution of 1920×1080i and a frequency of 60 Hz is inputted to a preceding circuit from a single signal line, a subsequent circuit generates signals with resolution of 1920×1080p for the right and left sides, and then the signals are outputted from two video signal lines 115a and 115b as shown in FIG. 6A.

As in the first embodiment, a liquid crystal drive unit 102 alternately displays a right-eye image and a left-eye image on a liquid crystal panel 103 every 120 Hz based on the left and right video signals (right-eye video signal 101a and left-eye video signal 101b) inputted from the two signal lines 115a and 115b having a frequency of 60 Hz, and right-eye light emission intensity 108a and left-eye light emission intensity 108b are calculated based on the right-eye video signal 101a and the left-eye video signal 101b every 60 Hz. In the second embodiment, the signals of the right-eye light emission intensity 108a and the left-eye light emission intensity 108b are inputted to the average filter 212 in FIG. 5 or the weighted filter 213 in FIG. 7, and then left light emission intensity and right light emission intensity are merged into one. The merging method may be a simple averaging method using the average filter 212. In the weighted filter 213 in FIG. 7, the weight calculation unit 215 has a configuration simply illustrated in FIG. 8. Specifically, the following method may be used: an intensity difference outputted from the intensity difference detection unit 214 is divided into an absolute value and a sign, is weighted by a weight function unit 215A according to the absolute value of the intensity difference, and the output of the weight function unit 215A is allocated to a right weighted output and a left weighted output by a left-right allocation unit 215B according to the sign of the intensity difference.

In the case of averaging, an average light-emission intensity signal is obtained by averaging left-eye light emission intensity serving as first light emission intensity and right-eye light emission intensity serving as second light emission intensity. The average light-emission intensity signal is preferably outputted to an LED driver 104 for driving an LED backlight 105. Instead of the average light-emission intensity signal, a signal smoothed based on past average light-emission intensity signals may be outputted to the LED driver 104 for driving the LED backlight 105. The smoothed signal is an average light-emission intensity signal obtained by averaging left-eye light emission intensity and right-eye light emission intensity.

In the case of weighting, for example, a difference of intensity between the right-eye light emission intensity 108a and the left-eye light emission intensity 108b is detected by the intensity difference detection unit 214. The weight calculation unit 215 calculates a weighting factor for each of the right-eye light emission intensity 108a and the left-eye light emission intensity 108b based on the intensity difference detected by the intensity difference detection unit 214. The weighting factor for the right-eye light emission intensity 108a will be referred to as a right weight. The weighting factor for the left-eye light emission intensity 108b will be referred to as a left weight. The integration unit 216 multiplies the right-eye light emission intensity 108a by the right weight and then outputs the multiplication result to the addition unit 218. The integration unit 217 multiplies the left-eye light emission intensity 108b by the left weight, and then outputs the multiplication result to the addition unit 218. The addition unit 218 adds the multiplication results of the integration unit 216 and the integration unit 217 and outputs the addition result.

The weighting factor calculated by the weight calculation unit 215 preferably assigns weights close to higher intensity in the case of an intensity difference between the right-eye light emission intensity 108a and the left-eye light emission intensity 108b. In other words, in the case where a difference of intensity is large between the right-eye light emission intensity 108a and the left-eye light emission intensity 108b and the right-eye light emission intensity 108a is larger than the left-eye light emission intensity 108b, a weighting factor is calculated such that the right weight is larger than the left weight, and vice versa.

As shown in FIG. 8, as the intensity difference between the right-eye light emission intensity 108a and the left-eye light emission intensity 108b increases, a combined weight is more preferably corrected close to higher one of the right-eye light emission intensity 108a and the left-eye light emission intensity 108b. A weighting factor outputted by the weight function unit 215A in FIG. 8 comes closer to 1 as the absolute value of the intensity difference increases. In the case where a difference of intensity between the right-eye light emission intensity 108a and the left-eye light emission intensity 108b is not found, the weight function unit 215A outputs a weight of 0.5. The left-right allocation unit 215B calculates a right weight and a left weight based on the weighting factor outputted from the weight function unit 215A. Specifically, the left-right allocation unit 215B sets the weighting factor outputted from the weight function unit 215A, as a weighting factor for higher one of the right-eye light emission intensity 108a and the left-eye light emission intensity 108b. Thus, in the case of a large parallax, darkening more than necessary and a reduction in contrast can be advantageously minimized.

Furthermore, the right-eye video signal 101a and the left-eye video signal 101b may be combined while being corrected closer to higher intensity of the right-eye video signal 101a and the left-eye video signal 101b. Thus, even if the two signals are combined, the signals can be adjusted closer to higher intensity, thereby suppressing darkening of a viewed image. Moreover, two-dimensional table data corresponding to the intensity values of the right-eye light emission intensity 108a and the left-eye light emission intensity 108b may be stored in a memory or the like, and then output intensity values corresponding to these intensity values may be outputted. Furthermore, data to be weighted by the two-dimensional table may be stored.

Figure 6B:
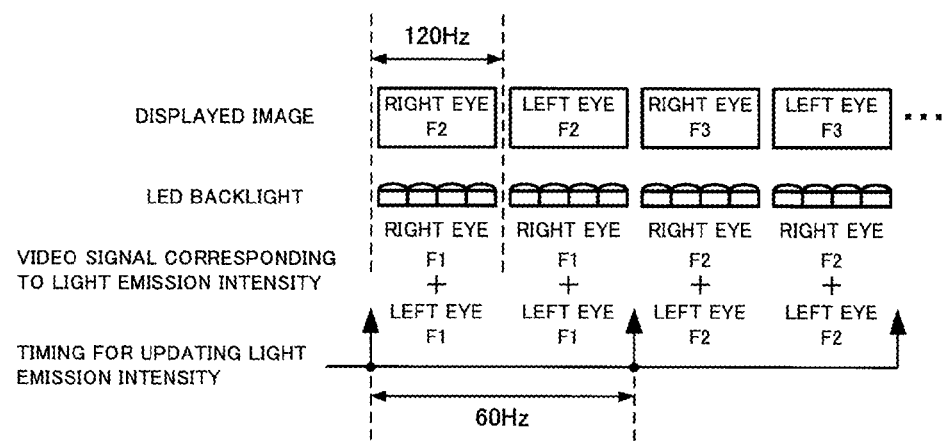
FIG. 6B shows the relationship between the frame rate of a displayed image of the video display device and the timing for updating light emission intensity.

Since the left light emission intensity and the right light emission intensity are recalculated every 60 Hz, the outputs of the average filter 212 and the weighted filter 213 are updated every 60 Hz and then are transferred to the LED driver 104 every 60 Hz as shown in FIG. 6B.

Unlike in the video display device 100 in FIG. 2B, as shown in FIG. 6B, a feature quantity and light emission intensity are calculated at a half rate (60 Hz) of the frame rate of a displayed image, the light emission intensity is updated, and then the feature quantity and the light emission intensity are reflected on the LED backlight 105 in the video display device 200. Right-eye images and left-eyes images are alternately displayed on the liquid crystal panel 103 every 120 Hz. The light emission intensity of the LED backlight 105 for illuminating the image from the back is a common value used in a left-right image period having the same frame number. The light emission intensity is calculated from right-eye and left-eye video information. Thus, an unnatural view does not occur in a period during which either of the right and left images is displayed on the liquid crystal panel 103.

With this configuration, communications relating to the light emission intensity of LED are carried out with the LED driver 104 every 60 Hz. Thus, extraneous radiation at this point can be considerably reduced as compared with the video display device 1000 and the signal processing device 1010 of the conventional configuration, thereby preventing noise from adversely affecting other electronic components.

The average filter 212 may be a filter provided along a time axis. The calculation results of light emission intensity of left and right images are summed and averaged through the filter provided along the time axis according to Infinite Impulse Response (IIR), and then a light emission intensity command value is transmitted to the LED driver 104 every 60 Hz. The filter along the time axis may reset a previous value every 60 Hz or keep outputting results without resetting the value. "A video signal corresponding to light emission intensity" in FIG. 6B is mixed by the filter along the time axis, indicating the frame number of an equivalently calculated input image.

Figure 9:
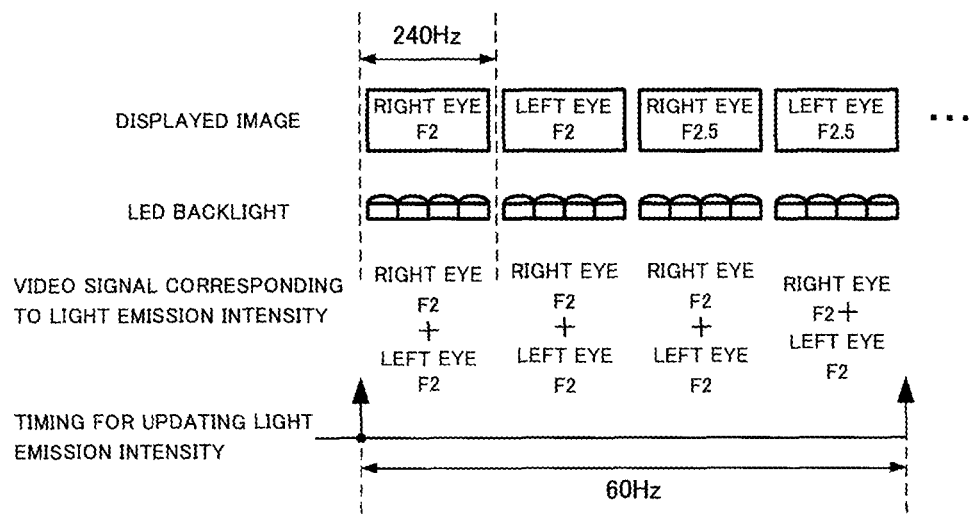
FIG. 9 shows the relationship between the frame rate of a displayed image and the timing for updating light emission intensity in a modification of the video display device according to the second embodiment.

Additionally, an image quality adjusting circuit located prior to a (the) liquid crystal drive unit 102 may include a so-called "double-speed engine". The double-speed engine is a circuit that outputs an image with a higher frame rate than an input frame rate by frame interpolation. Instead of simple conversion to a frame rate of an integral multiple, a 24-Hz image can be converted to 60 Hz by 2-3 pulldown, or a 50-Hz image can be converted to 60 Hz. In this example, left and right 60-Hz video signals are converted to 120-Hz video signals. In order to keep the processing speed of the video signal for each pixel, two video signal paths need to be additionally provided because of the doubled information amount of the video signal. Thus, the output video signal of the double-speed engine is inputted to the liquid crystal drive unit 102 through two left signal lines and two right signal lines, that is, four signal lines in total. Finally, the right-eye video signal 101a and the left-eye video signal 101b are alternately displayed on the liquid crystal panel 103 every 240 Hz. Local contrast control is performed by a local control unit 106 based on the combination results of light emission intensity values determined by the left and right video signals every 60 Hz. In other words, as shown in FIG. 9, the same light emission intensity is adapted for four frames of a displayed image on the liquid crystal display panel 103. FIG. 9 corresponds to FIG. 6B. F2.5 in FIG. 9 indicates a frame generated by interpolation based on inputs F2 and F3. Typically, frame interpolation causes a delay from an image in theory. In this case, it is assumed that the delay is equivalent to the input of one frame. Thus, as shown in FIG. 6B, the frame number integer portion of an image matches with a frame number obtained by calculating a feature quantity and light emission intensity, also in the subsequent embodiments.

With this configuration, the timing for displaying an image on the liquid crystal panel 103 perfectly matches with the timing for adjusting intensity by the LED backlight 105 (i.e., the frame numbers of the liquid crystal panel 103 and the LED backlight 105), advantageously achieving local contrast control in quite a satisfactory manner.

As has been discussed, in the video display device 200 and the signal processing device 220 according to the present embodiment, a relatively simple circuit including a parallax detection unit 109, a light emission intensity generation unit 111, and the average filter 212 (or the weighted filter 213 or a two-dimensional table) can replace the local control unit 1006a that calculates light emission intensity for a right eye and the delay memory 1008 for a left eye in the video display device 1000 and the signal processing device 1010 of the conventional configuration, achieving a smaller circuit size than in the conventional configuration. Furthermore, the second embodiment makes it possible to further reduce a serial transfer period for the LED driver 104 by one-half (for example, from 120 Hz to 60 Hz) without degrading image quality, thereby reducing extraneous radiation caused by serial transfer, considerably reducing the possibility of adverse effects of noise on other electronic components. In the case where "left-eye video signal+depth information (equivalent to parallax information)" is inputted instead of the right-eye video signal and the left-eye video signal, the parallax detection unit 109 is not necessary and depth information, which is a direct input signal, is inputted to the light emission intensity generation unit 111 as parallax information. In this case, the circuit size is further reduced.

(Third Embodiment)

Figure 10:
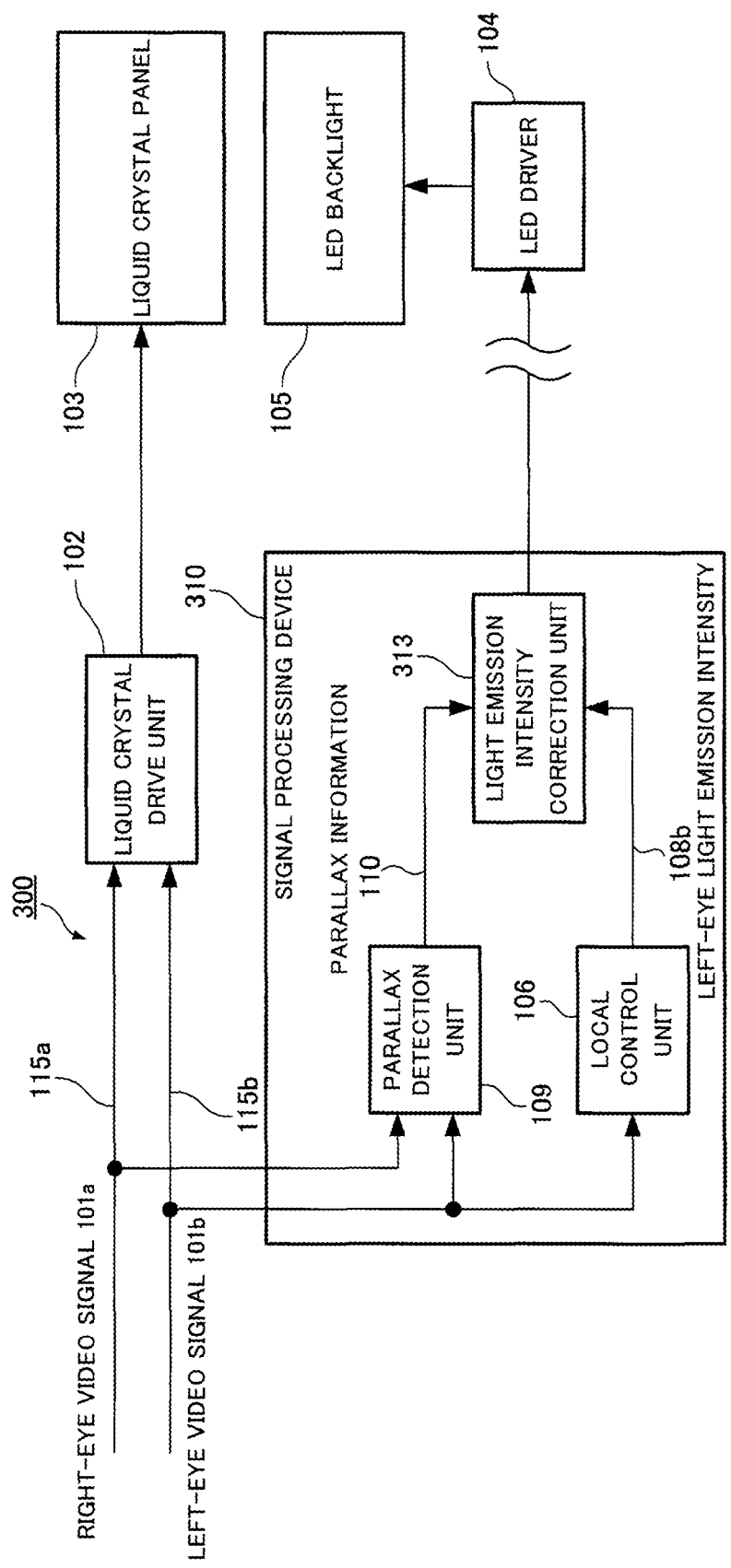
FIG. 10 is a block diagram illustrating the configuration of a video display device including a signal processing device according to a third embodiment.

FIG. 10 is a block diagram illustrating the configuration of a video display device 300 according to a third embodiment. FIG. 10 corresponds to FIG. 5 of the second embodiment. As illustrated in FIG. 10, in the video display device 300 and a signal processing device 310 according to the third embodiment, an light emission intensity correction unit 313 is provided instead of the video display device 200 and the light emission intensity generation unit 111 and the average filter 212 in the signal processing device 220 according to the second embodiment.

Figure 11A:
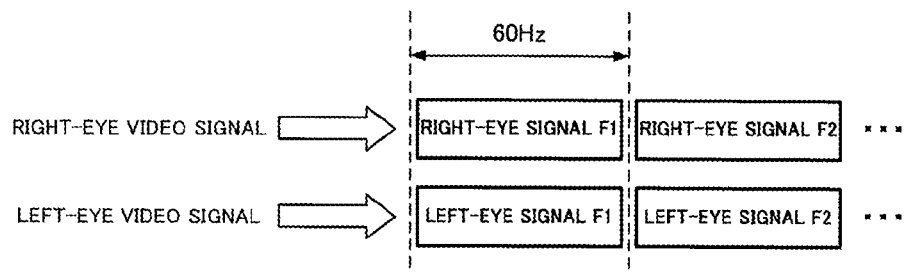
FIG. 11A shows video signals inputted to the video display device.
Figure 11B:
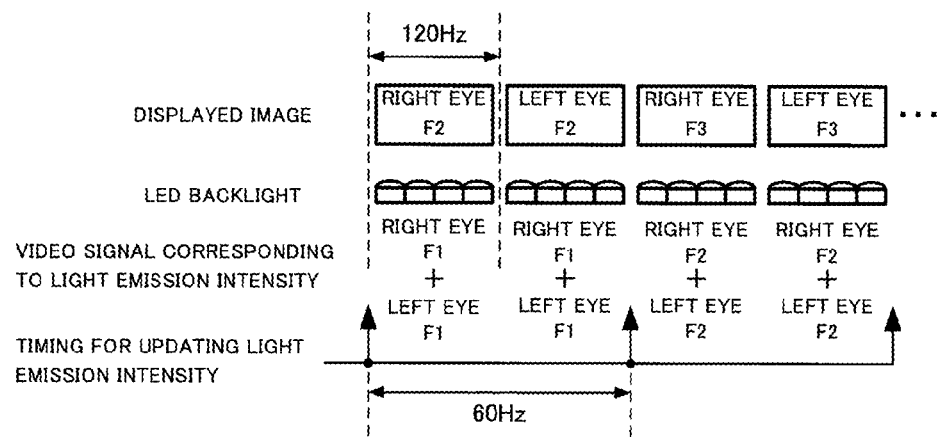
FIG. 11B shows the relationship between the frame rate of a displayed image of the video display device and the timing for updating light emission intensity.
Figure 14:
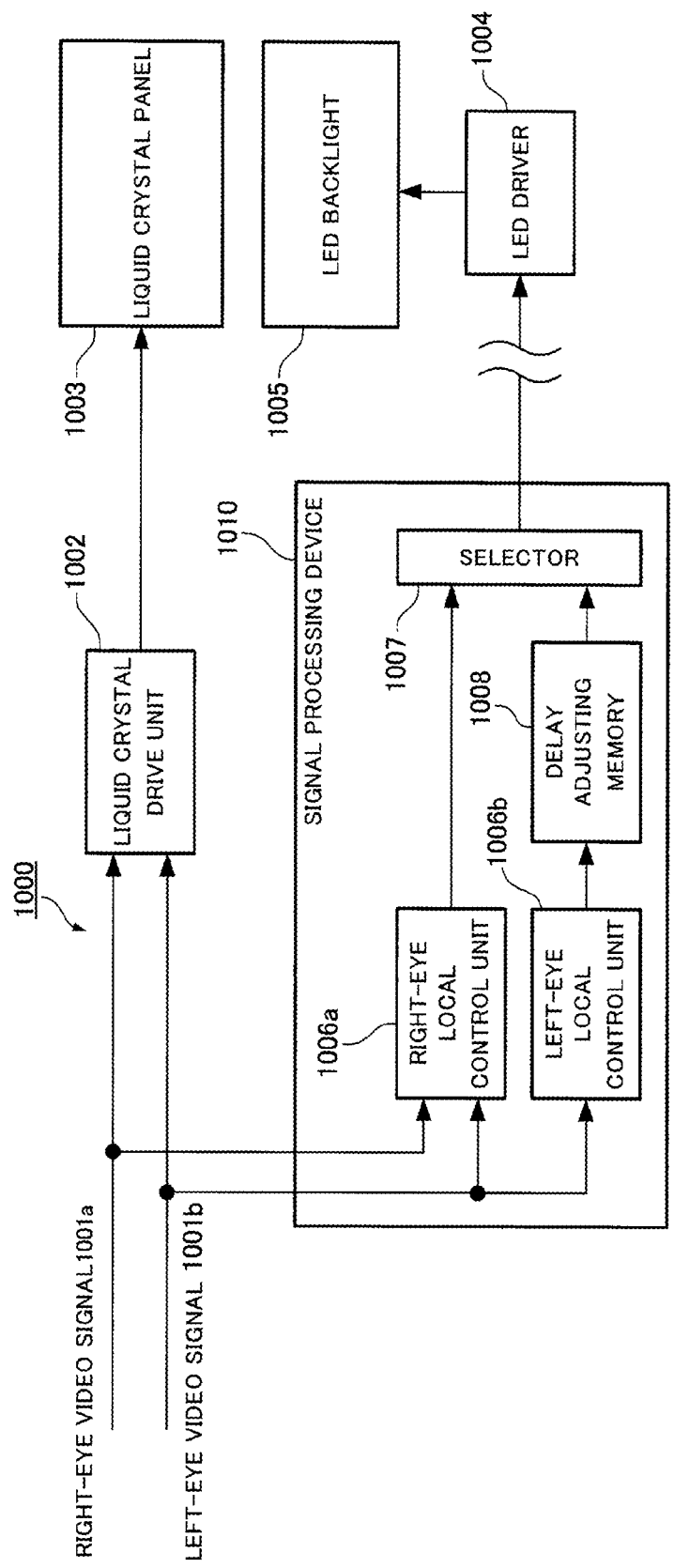
FIG. 14 is a block diagram illustrating the configuration of a video display device including a conventional signal processing device.
Figure 15A:
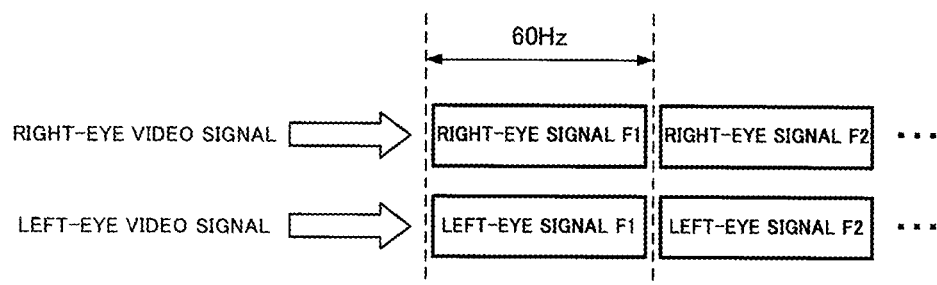
FIG. 15A shows video signals inputted to the conventional video display device.
Figure 15B:
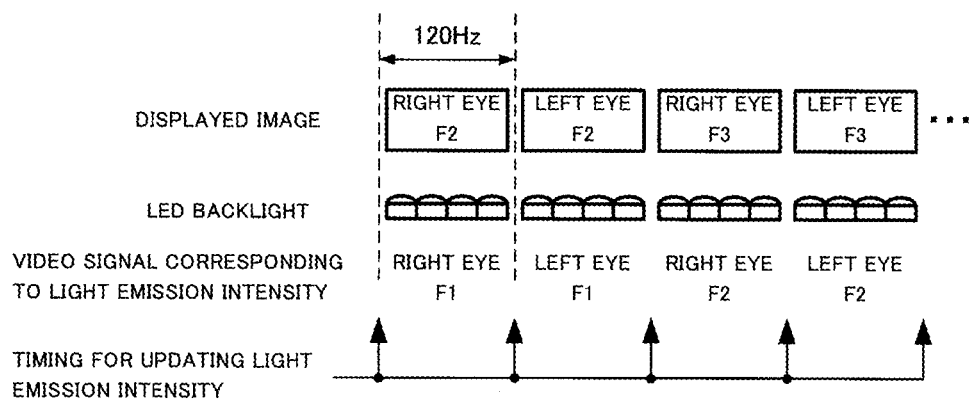
FIG. 15B shows the relationship between the frame rate of a displayed image of the conventional video display device and the timing for updating light emission intensity.

The light emission intensity correction unit 313 calculates light emission intensity directly based on left and right video signals without generating right-eye light emission intensity from parallax information 110 of left and right video signals and left-eye light emission intensity. For example, a parallax contained in the parallax information is reduced by one-half, and the left-eye light emission intensity is properly corrected by shifting to the right and left based on the reduced parallax information. Hence, the same effect can be obtained as in the case where an image corresponding to a video signal 101 (a right-eye video signal 101a and a left-eye video signal 101b) is two-dimensionally generated and then the 2D image having a frequency of 60 Hz is passed through a local control unit 106 to obtain light emission intensity. Final light emission intensity is serially transferred to an LED driver 104 from the light emission intensity correction unit 313 every 60 Hz. FIG. 11A shows video signals inputted to the video display device 300. FIG. 11B schematically shows the timing for updating a displayed image and an LED backlight 105. FIGS. 11A and 11B correspond to FIGS. 6A and 6B.

The light emission intensity may be corrected or controlled based on the magnitude or direction of a parallax (parallax vector).

As has been discussed, the video display device 300 according to the third embodiment can reduce extraneous radiation while further simplifying the circuit configuration.

In the case where "left-eye video signal+depth information (equivalent to parallax information)" is inputted instead of the right-eye video signal and the left-eye video signal, a parallax detection unit 109 is not necessary. Depth information, which is a direct input signal, is inputted as parallax information to the light emission intensity correction unit 313. In this case, the circuit size is further reduced. Also in this configuration, the LED backlight 105 is driven according to intensity corrected based on a right-eye light emission intensity signal 108a and a left-eye light emission intensity signal 108b, achieving local control for a high-quality 3D image. Specifically, local control only based on an intensity signal for one viewpoint of the right-eye video signal 101a and the left-eye video signal 101b may cause unbalanced intensity when an image for the other viewpoint is displayed. The present embodiment can suppress the occurrence of such a problem.

(Fourth Embodiment)

FIG. 12 is a block diagram illustrating the configuration of a video display device 400 according to a fourth embodiment. FIG. 12 corresponds to FIG. 10 of the third embodiment. In the video display device 300 and the signal processing device 310 according to the third embodiment, light emission intensity for local contrast control is determined from an image for one eye and is corrected by parallax information extracted from left and right video signals, so that the same light emission intensity is obtained as in the case where a 2D video signal is passed through the local control unit. The video display device 400 according to the fourth embodiment is different from the third embodiment in that a 2D video signal is actually generated and is passed through a local control unit 106 to obtain the same output as in the third embodiment.

In a parallax detection unit 109, parallax information 110 is obtained from left and right video signals 101 (right-eye video signal 101a and left-eye video signal 101b) in a similar manner. Then from the extracted parallax information 110, the left and right video signals 101 are combined in a 2D conversion unit 414 to obtain a both-eye video signal 415 that is a 60-Hz 2D video signal. The both-eye video signal 415 can be generated according to the parallax information by proper shifting correction on the left and right video signals in a lateral direction. Only one of the left and right video signals may be inputted to the 2D conversion unit 414. The both-eye video signal 415 is then inputted to the local control unit 106 to determine light emission intensity for each partial control area on an LED backlight 105 based on the feature quantity of the image. Likewise, light emission intensity determined every 60 Hz is serially transmitted to an LED driver 104 every 60 Hz.

As has been discussed, the video display device 400 according to the fourth embodiment can reduce extraneous radiation with a simpler circuit configuration than in the conventional configuration. The determined both-eye video signal may be inputted to a liquid crystal drive unit 102 instead of the left and right video signals. Generally, in the case of a 3D image viewed as a 2D image, only one of the left and right video signals is reproduced. The viewed image is, however, laterally shifted from the 3D image. In the case where a 3D image viewed as a 2D image with such a difference is not preferable, the configuration of the fourth embodiment is useful because of a small difference between 3D display and 2D display. Instead of intensity control for an original image, local control can be performed according to human visual characteristics, advantageously achieving visual recognition with more natural emission characteristics.

In the case where "left-eye video signal+depth information (equivalent to parallax information)" is inputted instead of the right-eye video signal and the left-eye video signal, the parallax detection unit 109 is not necessary. Depth information, which is a direct input signal, is inputted as parallax information to the 2D conversion unit 414. Additionally, the left-eye video signal 101b is inputted to the 2D conversion unit. The right-eye video signal as an input signal is not present. In this case, the circuit size is further reduced.

The explained embodiments are preferred exemplary embodiments of the present invention, and the contents of the present invention are not limited to the embodiments. In other words, the configurations and operations of the devices described in the embodiments are simply exemplary and apparently, partial modification, addition, and deletion are allowed within the scope of the contents of the present invention.

The video display device and the signal processing device according to the present invention can obtain the effect of displaying a 3D image by using local contrast control with high quality while reducing radiation caused by a circuit load or high-speed transmission.

The video display device and the signal processing device according to the present invention are useful as a video display device or a backlight device requiring a light source, e.g., a liquid crystal display, and a signal processing device used for these devices. The video display device including the signal processing device can be used as, for example, a liquid crystal display device such as a liquid crystal television and a liquid crystal monitor.

What is claimed is:

1. A signal processing device that outputs a control signal to light emitting elements having a plurality of light emission areas for emitting light to an image display part from a back for the respective light emission areas corresponding to a plurality of display areas included in the image display part capable of displaying a three-dimensional image by receiving a left-eye video signal and a right-eye video signal, the control signal controlling intensity of each of the light emission areas according to intensity of an image, the signal processing device comprising a light emission intensity determination circuit that determines light emission intensity based on at least one of the left-eye video signal and the right-eye video signal and one of parallax information and depth information of the image and outputs information on the light emission intensity to the light emitting elements.

2. The signal processing device according to claim 1, wherein the light emission intensity determination circuit comprises:

a local control circuit that determines first light emission intensity corresponding to a first video signal serving as a video signal for one viewpoint of the left-eye video signal and the right-eye video signal;

a parallax detection circuit that obtains parallax information from the left-eye video signal and the right-eye video signal; and a light emission intensity generation circuit that generates second light emission intensity corresponding to the video signal for the other viewpoint based on the first light emission intensity and the parallax information.

3. The signal processing device according to claim 2, further comprising a selection circuit that switches the signal corresponding to the first light emission intensity and the signal corresponding to the second light emission intensity, and outputs the signal to a drive circuit that drives the light emitting elements.

4. The signal processing device according to claim 2, wherein the light emission intensity determination circuit comprises:

a filter processing circuit that outputs a signal with average light emission intensity obtained by averaging the first light emission intensity and the second light emission intensity, to a drive unit that drives the light emitting elements.

5. The signal processing device according to claim 2, wherein the light emission intensity determination circuit comprises:
a filter processing circuit that outputs a signal smoothed based on past average light-emission intensity signals, to a drive circuit that drives the light emitting elements, the smoothed signal having average light emission intensity of the first light emission intensity and the second light emission intensity.

6. The signal processing device according to claim 2, wherein the light emission intensity determination circuit comprises:
a filter processing circuit that combines the first light emission intensity and the second light emission intensity while correcting the first light emission intensity and the second light emission intensity closer to higher one of the first light emission intensity and the second light emission intensity, and then outputs the light emission intensity to a drive circuit that drives the light emitting elements.

7. The signal processing device according to claim 2, wherein the light emission intensity determination circuit comprises:
a filter processing circuit that combines the first light emission intensity and the second light emission intensity while correcting the first light emission intensity and the second light emission intensity closer to higher one of the first light emission intensity and the second light emission intensity as a difference of intensity increases between the first light emission intensity and the second light emission intensity, and then outputs the light emission intensity to a drive circuit that drives the light emitting elements.

8. The signal processing device according to claim 1, wherein the light emission intensity determination circuit comprises:
a local control circuit that determines first light emission intensity corresponding to a first video signal serving as a video signal for one viewpoint of the left-eye video signal and the right-eye video signal; and
a light emission intensity generation circuit that generates second light emission intensity corresponding to the video signal for the other viewpoint based on the first light emission intensity and the depth information of the image.

9. The signal processing device according to claim 1, wherein the light emission intensity determination circuit comprises:
a local control circuit that determines first light emission intensity corresponding to a first video signal serving as a video signal for one viewpoint of the left-eye video signal and the right-eye video signal; and
a light emission intensity correction/generation circuit that corrects the first light emission intensity based on one of parallax information and depth information of the video signal to generate information about common light emission intensity.

10. The signal processing device according to claim 1, wherein the light emission intensity determination circuit comprises:
a both-eye image conversion circuit that obtains a both-eye video signal based on a first video signal serving as a video signal for one viewpoint of the left-eye video signal and the right-eye video signal and one of parallax information and depth information of the video signal; and
a local control circuit that determines light emission intensity based on the both-eye video signal of the both-eye image conversion circuit.

11. The signal processing device according to claim 1, wherein the light emission intensity determination circuit has an updating period that is 1/N of a frame period displayed on the image display part, where N is an even number.

12. The signal processing device according to claim 1, wherein the light emission intensity determination circuit has an updating period that is a frame period not longer than a frame period displayed on the image display part.

13. The signal processing device according to claim 1, further comprising an interpolation circuit that interpolates the video signal to output a video output signal to the image display part at a higher frequency than a frequency of an input signal of the video signal,
wherein light emission intensity information is outputted to the light emitting elements concurrently with an image outputted to the image display part, the light of a same frame number as the outputted image.

14. A video display device comprising:
an image display part that has a plurality of display areas and is capable of displaying a three-dimensional image by receiving a left-eye video signal and a right-eye video signal;
a display drive circuit that drives the image display part;
light emitting elements that have a plurality of light emission areas corresponding to the respective display areas and emit light from a back for the respective light emission areas;
a light-emitting element drive circuit that drives the light emitting elements; and
the signal processing device according to claim 1.

* * * * *